Feb. 16, 1926.

1,573,733

I. H. MORSE

PROCESS FOR CLARIFYING SACCHARINE LIQUORS

Filed June 29, 1925     3 Sheets-Sheet 3

INVENTOR
Irving H. Morse
BY Wilkinson & Gusta
ATTORNEYS.

Patented Feb. 16, 1926.

1,573,733

UNITED STATES PATENT OFFICE.

IRVING H. MORSE, OF NEW ORLEANS, LOUISIANA, ASSIGNOR OF ONE-FOURTH TO ERNEST R. THERIOT, OF ASHTON, LOUISIANA, AND ONE-FOURTH TO DEMAS MORESI, OF JEANERETTE, LOUISIANA.

PROCESS FOR CLARIFYING SACCHARINE LIQUORS.

Application filed June 29, 1925. Serial No. 40,344.

*To all whom it may concern:*

Be it known that I, IRVING H. MORSE, a citizen of the United States, residing at New Orleans, in the parish of Orleans and State of Louisiana, have invented certain new and useful Improvements in Processes for Clarifying Saccharine Liquors; and I do hereby declare the following to be a full, clear, and exact description of the invention, such as will enable others skilled in the art to which it appertains to make and use the same.

My present invention relates to an improved process of clarifying saccharine liquors and particularly to the clarification of juice from the sugar cane.

Perfect clarification involves a complete removal of mechanical and chemical impurities by means of decantation and filtration, assisted by the use of chemicals and heat. It includes also the protection of the sucrose and glucose from the action of acids and alkalies, so that these two substances may remain intact throughout the manufacturing process.

The solid matter in cane juice may be conveniently divided into three parts, sucrose, glucose and non-sugar.

*Sucrose.*—Sucrose is inverted by acids and changed into glucose, the amount depending on the strength of the acid, the time of contact, and the degree of heat applied. It is not affected by treatment with alkalies.

*Glocuse.*—Glucose is not affected by acids but is decomposed by alkalies. The decomposition products are exceedingly detrimental to the subsequent manufacturing process, especially if the best grades of sugar and molasses are desired.

*Non-sugar.*—The non-sugars of the juice are composed of many substances, some organic, such as cane wax, albumen, etc., and others inorganic. Of these only a few are eliminated by the treatment with lime and heat. Experiments have proven that the greater quantity of these non-sugars are removed when the juices are neutral.

From the above statements it is quite evident that the best results are obtained when the juices are neutral, since none of the sucrose is inverted, no glucose can be decomposed, and more non-sugars are removed. By means of the special apparatus and the control of the process, I claim that most effective clarification can be obtained.

But there are many difficulties met with in securing a perfectly neutral juice, the most important one being the exceedingly small amount of lime used for treating the juices. The approximate ratio of the lime to the juice is 1 to 1,000, which means that every pound of lime added should, if possible, be mechanically divided into 1,000 equal parts, so that each pound of juice will be brought in contact with one-thousandth of a pound of lime. To do this always requires a considerable period of time, even when the most efficient device for mixing is employed. But unfortunately this admixture of the lime and juice must take place instantly. If there is a perceptible delay, a part of the juice becomes alkaline and this brings about a decomposition of the glucose present. The later equalization of the juices does not return the decomposed glucose to its original state.

This is the inherent weakness of the present method of liming the juice. To attempt to mix the milk of lime in liming tanks is fundamentally wrong since it is a physical impossibility to secure a uniform contact of the lime with the substances in the juice with which the lime combines, before the decomposition of the glucose takes place. Unless the admixture is brought about instantly, perfect clarification will never be obtained. My method of bringing about an instantaneous admixture of the lime and juice will be hereinafter described in detail.

In order to remedy, as far as possible, the objections hereinbefore referred to and to secure the most effective results, I have designed the process and apparatus which will be hereinafter described, the invention being intended especially to accomplish, amongst other desired results, first, the removal of the major portion of the cane wax in the juice before it is treated with lime, second, the gradual liming of the juice during the passage through a series of tanks, third, the gradual heating in conjunction with the liming, and, fourth, the removal of a large part of the sediment before the juice reaches the defecators.

My invention will be more clearly understood after reference to the accompanying drawings, in which like parts are indicated by similar reference symbols throughout the several views, and in which.

The saccharine liquor, such as raw juice from the mill, goes from the pipe A into the sulphur box B, and is carried off from the sulphur box by the conduit B'. The sulphur fumes enter the base of the sulphur box through the pipe C and are carried off through the top thereof by the pipe C'.

In order to finely divide the liquor as it is being treated by the sulphur fumes, I provide a shaft $B^2$ carrying scattering discs or plates $b$, which shaft is rapidly rotated by the pinion $b'$ driven by the gear-wheel $B^3$.

The sulphur box is also provided with the usual perforated baffles $b^2$.

The juice flows from the conduit B' to the sampling box D, where a small proportion thereof is separated from the main body, as will be hereinafter more fully described. The bulk of the juice flows into the juice tank E, whence it is carried to the liming tanks.

I have shown two groups of four each of these liming and heating tanks, each connected to a separate receiving tank connected to the sulphur box, and the last member of each group being connected to the defecator charge tank, from which the treated juice is carried to the defecators.

The juice is carried from the receiving tank E by the pipe E' to the first liming tank H and overflows from this tank into the second liming tank H', and from this to the third liming tank $H^2$, and from the third to the fourth liming tank $H^3$, finally flowing into the common defecator charge tank I, from which it is carried off by means of the pipe I'.

Each of the liming tanks is provided with an annular overflow trough $H^0$, and this trough is placed at a slightly higher elevation than the trough of the next tank in the system, so that there will be a continuous flow from the one tank to the other, the tanks preferably decreasing in size for obvious reasons.

Each tank is provided with a heating coil L and the bottom of the tank is preferably hopper-shaped and provided with a drain pipe $h$, controlled by the valve $h'$. In the upper portion of the conical bottom chamber or hopper, I provide a baffle plate $h^0$ to prevent the rotary motion in the liquor in said hopper.

Each liming tank may be provided with a suitable testing cock $h^3$ and with a thermometer $h^4$.

J represents the apparatus for separating the wax or other sticky portions from the sediment, preferably a car or cars carrying a suitable filtering arrangement, such as burlap bags filled with black Spanish moss, through which the liquid portion of the sediment passes, leaving the sticky portions adhering to the bags and to the moss.

K represents a tank for the reception of the wax-free liquid from the first liming tank, or the first two liming tanks, and K' represents a tank for the sediment from the second pair of liming tanks. P and P' represent pumps carrying off this liquid from the two tanks, just referred to.

Figure 1:
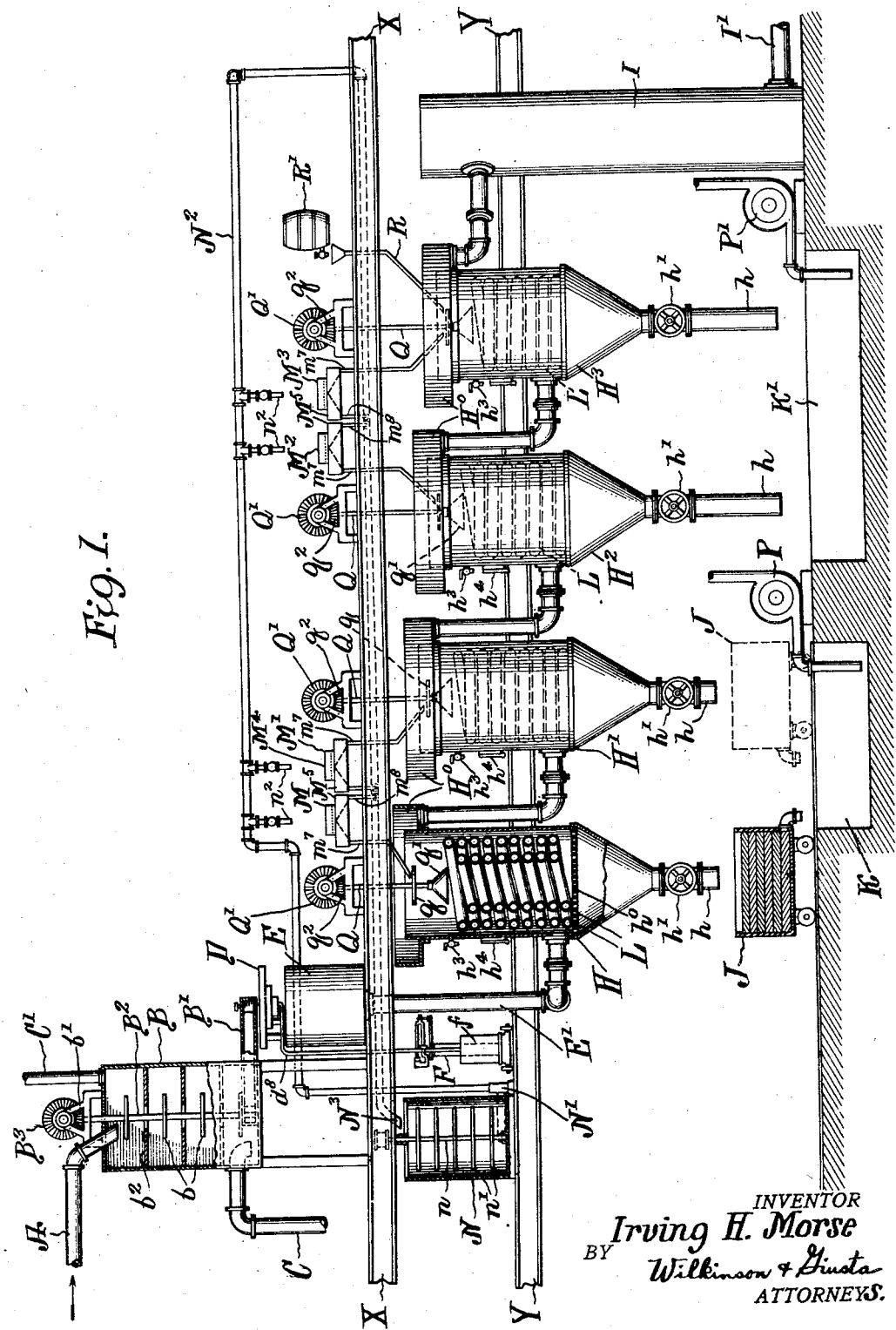
Fig. 1 is a diagrammatic view showing an elevation of the complete apparatus, parts being broken away.
Figure 4:
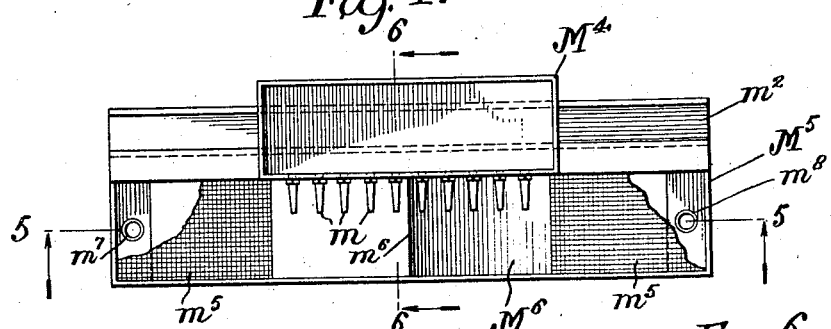
Fig. 4 is a plan view of the liming apparatus for supplying a graduated amount of lime to each tank.
Figure 5:
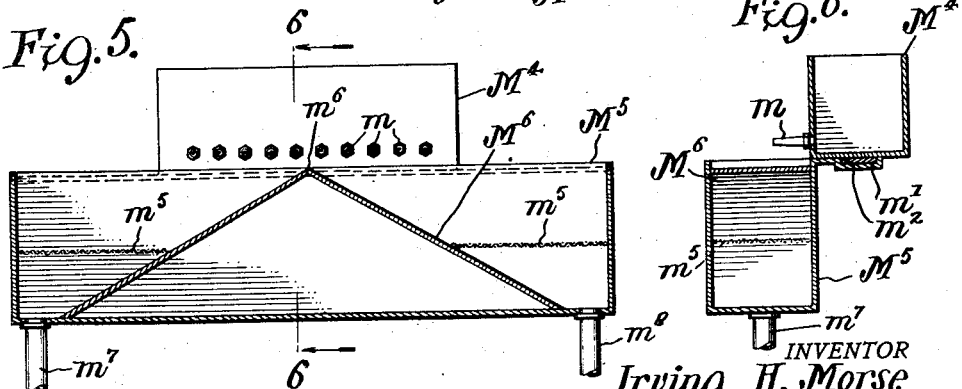
Fig. 5 shows a section along the line 5—5 of Fig. 4 and looking in the direction of the arrows.
Figure 6:
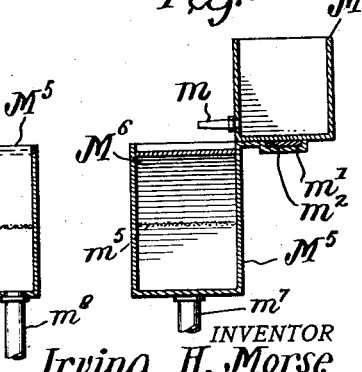
Fig. 6 shows a section along the line 6—6 of Fig. 4 and looking in the direction of the arrows.

Milk of lime is supplied to the various liming tanks in the desired proportions from the liming boxes M, M', $M^2$ and $M^3$, the details of which are shown in Figs. 4, 5 and 6, and will be hereinafter described. These liming boxes are supplied with milk of lime from the tank N, where the lime is held in suspension by the rotation of the shaft $n$, carrying arms or discs $n'$, this shaft being rotated in any convenient way. This milk of lime is conveyed from this tank N by the pump N' to the lime supply pipe $N^2$, and the requisite quantity of this milk of lime is supplied to each tank from the nozzles $n^2$, controlled by suitable valves, as shown in Fig. 1. The excess of lime is carried back to the tank N by the return pipe $N^3$ (see Fig. 1).

The nozzles $n^2$ would be normally opened to permit the continuous flow of the milk of lime, but the quantity actually admitted to each liming tank would be controlled by the liming box arrangement shown in detail in Figs. 4, 5 and 6, which will now be described.

Each liming box comprises an upper receptacle $M^4$ into which the milk of lime flows from the corresponding nozzle of the overhead pipe line $N^2$. Each of these receptacles $M^4$ is provided with a series of nozzles $m$, 10 are shown, and this receptacle $M^4$ is slidably mounted on the lower box $M^5$, as by means of the rib $m'$ engaging in the groove $m^2$ (see Fig. 6).

The lower box $M^5$ is provided with a deflecting partition in the form of an inverted V, as shown in $M^6$ in Fig. 5, the upper edge or crest of said position being shown at $m^6$. At each side of this V-shaped partition $M^6$, I provide screens $m^5$ and below these screens are pockets drained by pipes $m^7$ and $m^8$ respectively, as shown in Fig. 5.

The pipe $m^7$ leads to the liming tank, while the pipe $m^8$, which carries off the excess lime, is connected to the return pipe $N^3$ for returning the excess milk of lime back to the large reservoir N In order to distribute the milk which flows to the liming tanks in a finely divided manner, the outlets of the pipes $m^7$ are mounted above rotating discs $q$ on the shaft Q, which shaft carries the cone $q'$ and is driven by the pinion $q^2$ meshing with the gear-wheel $Q'$. There is one shaft Q for each liming tank and these shafts are driven at high speed with the following result. First, the cones $q'$ throw the liquor from the liming tank away from the center of the tank towards the circumference, causing it to overflow into the annular trough $H^o$ in a thin layer, and into this thin layer of liquid the milk of lime is thrown in the form of a spray under the centrifugal action of the rotating disc $q$, and thus this fine spray of milk of lime is uniformly fed to the thin layer of liquid, resulting in the complete and thorough commingling of the lime spray with the liquor, and causing the entire mass, and practically every individual drop thereof, to be subjected to the action of the lime as it flows over the edge of the liming tank. This results in the complete, thorough and intimate mixture of the milk of lime with the liquor being treated.

The quantity of lime to be admitted to each tank may be regulated from time to time by tests of the liquor for acidity, and the quantity supplied to each tank then may be controlled by manipulating the liming box, sliding the receptacle $M^4$ to the left or right as may be desired, and thus causing more or less of the lime to go into the tank or into the return pipe as may be desired. Thus, by moving the receptacle $M^4$ to the right, as in Fig. 6, a smaller quantity of lime will be supplied to the tank and more will be carried to the lime reservoir, while moving the receptacle $M^4$ in the reverse direction will cause a greater supply of lime to go to the tank and less returned. In this manner, the quantity of lime supplied to each tank may be quickly and easily regulated. It will be desirable to supply more lime to the first tanks in the system than to the others, for reasons that will be hereinafter more fully explained.

In addition to treating with lime, other chemicals may be supplied, such, for instance, as phosphoric acid, to the pipe R from the container $R'$ (see Fig. 1).

Since the juice coming from the mill or other source of supply is apt to be of varying saccharine contents, it is desirable to secure samples which will be fairly representative of the mass of the large body of juice to be treated. It is also equally important to obtain the weight or the volume of the juice received into the factory, whereby comparisons may be made of recoveries of commercial products during different periods. In order to accomplish these two objects, I have designed a special apparatus, shown in Fig. 3, which makes it possible to withdraw from the bulk of the juice one-tenth of one percent, or one part in one thousand, which can be accurately weighed on a comparatively small scale at regular intervals and the weight multiplied by 1000, giving the weight of the total juice. After weighing, a suitable portion is sent to the chemical laboratory for analyses.

Figure 2:
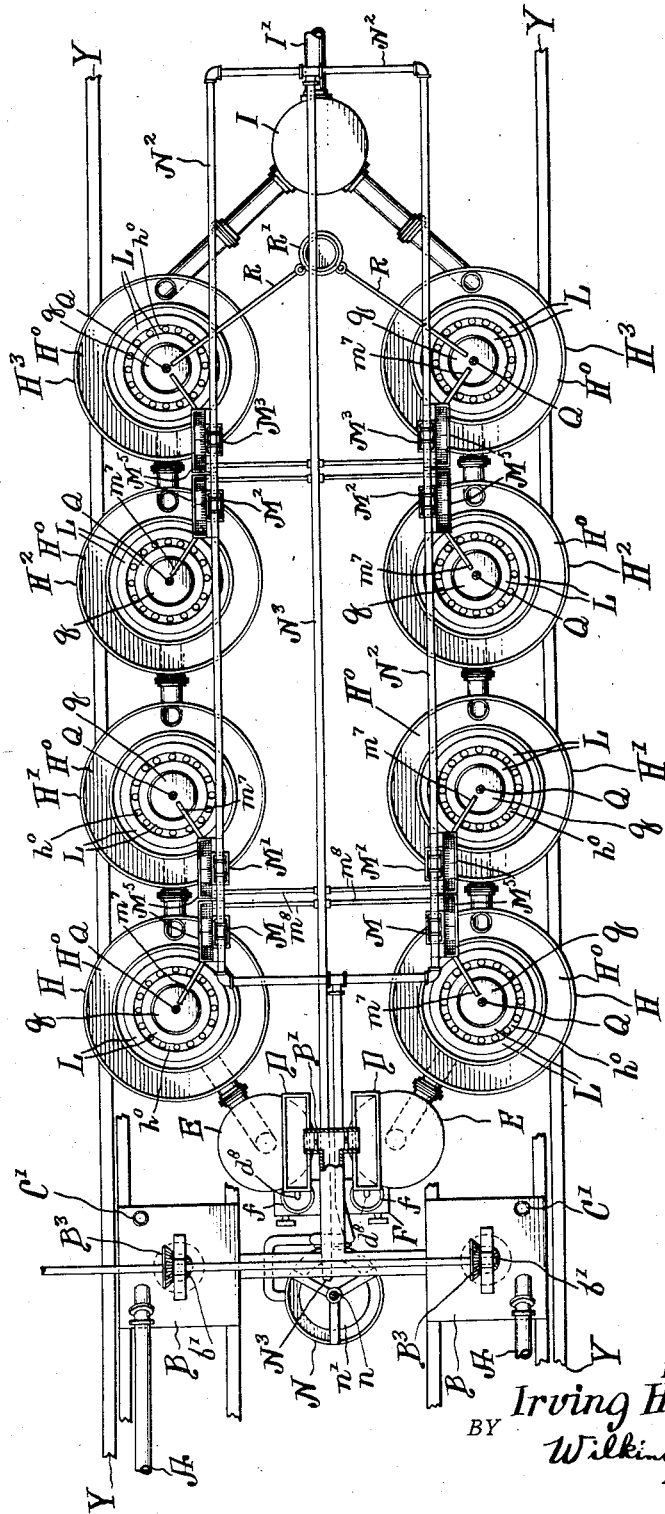
Fig. 2 is a plan view of the complete apparatus.
Figure 3:
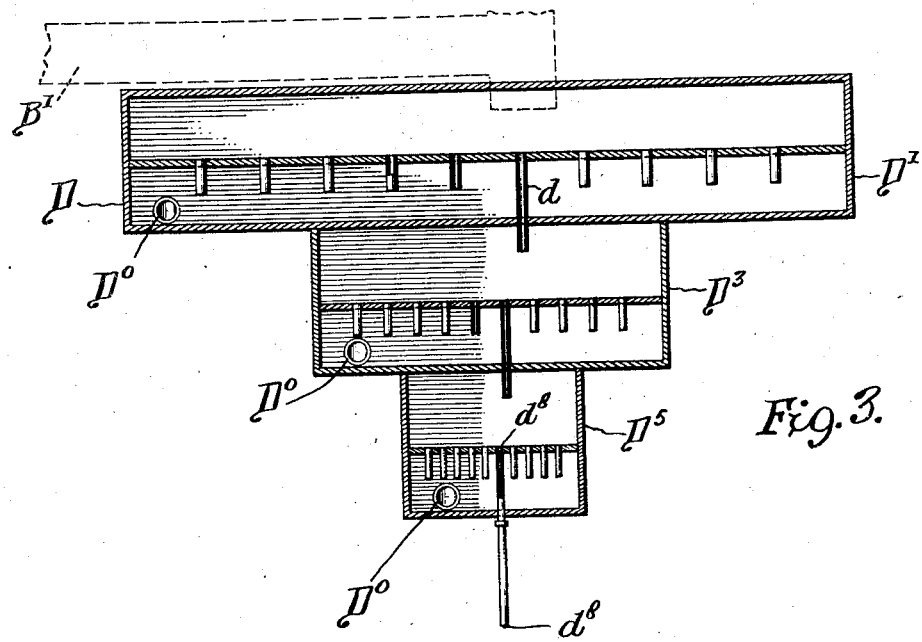
Fig. 3 is a sectional plan view of the apparatus for separating the predetermined portion of the liquor for testing and weighing purposes.

Fig. 3 shown on an enlarged scale and in section in Fig. 1 and Fig. 2 is comprised of three metal troughs, bolted together, $D'$, $D^3$ and $D^5$, all having the same width and height, but of unequal lengths and set at a different level, the shortest trough being the lowest. Thus $D'$ is four times as long as $D^5$ and set 4" above, and $D^3$ is double the length of $D^5$ and set 2" above $D^5$, so that the juice entering $D'$ will flow by gravity through the troughs as will be further described.

Each trough is provided with a longitudinal partition, dividing the trough into two equal compartments, to be known as the first and second compartment. Then round openings are cut in the partition near the bottom, the exact size depending on the volume of juice to be handled, and nine short pipes inserted, connecting the first and second compartments, while one long pipe $d$ is used to connect the first compartment of $D'$ and the first compartment of $D^3$. A similar arrangement is provided in $D^3$ and $D^5$; and the long pipe $d^3$ from $D^5$ leads to the container $f$, which sets on the scales F. Each of the second compartments of $D'$, $D^3$ and $D^5$ has an opening in the bottom and a pipe leading to the juice receding tank E.

The division of the juice by means of the apparatus is accomplished as follows: All of the extracted juice enters one of the troughs D, thence flows to $D'$, in the first compartment, and nine-tenths of this juice flows through the nine small pipes into the second compartment and to the tank E. One tenth of the juice flows through the long pipe into $D^3$, first compartment and is again divided, nine tenths going to tank E, and one tenth to $D^5$ first compartment. This is again repeated in $D^5$ and one one thousandths of the original juice flows through the long pipe $d^3$ into the receptacle $f$ on the scales F, where it is weighed and multiplied by 1000 for the weight of the original juice.

Obviously, by a similar arrangement, a smaller or greater fraction of the liquid going into the system may be drawn therefrom for test purposes, if desired.

It will be obvious that this liquid, so secured for test purposes, will fairly represent the average quality of the liquid going through the system.

The tanks should be conveniently arranged so as to provide a suitable gravity flow for the liquid. I have shown same as mounted on two floors XX and YY, of a suitable factory.

Having thus described in a general way the apparatus used in carrying out my invention, I will now proceed to describe the operation of the same in detail.

The raw juice coming from the mill enters the sulphur box, where it is separated into a series of films or sprays and through which the sulphur fumes pass, thus providing intimate contact between the sulphur fumes and the juice.

The sulphured juice passes to the sampling and dividing apparatus and a definite portion, (one in 1000) removed and weighed on an accurate scale, multiplied by 1000 to obtain the weight of the original juice. A part of this juice is taken to the chemical laboratory where it is tested for its acidity, density, percentage of sucrose, glucose, cane wax; such analyses forming the basis of the chemical control of the special clarification process. The balance of the juice is then poured back into the first liming tank.

The main body of the sulphured juice flows into the juice tank and passes into the first liming tank near the bottom thereof. Where the heavier solid matter tends to settle in the cone bottom, as is well known, the first action of the sulphur dioxide on entering the juice causes a coagulation of the albuminoid matter. A flocculent precipitate is formed and this carries down with it not only the albuminoids of the juice, but other mechanical impurities, such as fat and wax, particles of fiber, earthy matter from the cane, a considerable amount of gums, etc. It has been found that the quantity of precipitate which will deposit after the treating with sulphur fumes amounts to .3% to .4% of the weight of the juice.

It is very desirable to remove this precipitate before liming, if possible, and this is in a large measure accomplished in my apparatus, for this precipitate, after sulphuring, settles in the cone bottom of the first liming tank, where it is caused to remain quiescent and is protected against the swirling movement of the liquid in the upper portion of the tank by means of the baffle plate below the steam coils. This precipitate is drawn off from time to time into the fiber filter, consisting of burlap bags filled with moss and the solid matter is separated out, allowing the liquid free from wax to flow into the tank K, from which it may be pumped back to the system by the pump P.

The cane wax and albuminoids are sticky and adhere to the moss, and are removed from the process by washing the filter and running these objectionable impurities into the waste ditch. The cane wax may be recovered in a commercial form by first drying out the fibrous material with the adhering cane wax and extracting the wax with benzine.

The juice, in a large measure free from the sediment, will flow upwards in the first liming tank and the rotary cone $q'$ will cause it to swirl upwards, forming a minute whirlpool and causing a thin film or layer of the juice to overflow the first liming tank at the same time that the milk of lime is being sprayed on to it from the disc $q$. The continued flow of the juice over the rim of the tank will prevent any possibility of the over-liming of any portion of the juice.

In treating raw juices, I have found it preferable to use a major portion of the lime in treating the juice as it flows from the first tank. Thus, in treating the raw juice, I preferably use about 60% of the line in the first tank, 25% in the second tank, 10% in the third tank and 5% in the fourth tank; but it may be desirable to vary the proportions as from 60% in the first tank, 30% in the second tank, 10% in the third tank, and leaving the fourth tank to be treated with some other chemical, such as phosphoric acid, as will be hereinafter described.

After the juice, partly limed and having the larger proportion of the sediment separated therefrom, overflows from the first tank, it passes by gravity into the lower portion of the second tank, where the sediment may be again drawn off and passed through filters of any suitable kind, the main body of the juice flowing gently upwards in the second tank and being whirled around the upper portion of the said tank and treated with lime in lesser quantity.

The juice overflowing from the second tank flows into the third tank, where the process of sedimentation and further liming, but with a lesser amount of lime, is repeated, and finally this juice overflows the third tank and enters the fourth or last tank, where the sedimentation process is again repeated and the overflow juice escapes into the defecator charge tank. In this last tank, a small quantity of lime may be added; or this may be supplemented by, or preferably replaced by, a small quantity of dilute phosphoric acid from the receptacle R', which passes through the pipe R onto the rotating disc and is thoroughly mixed with the overflowing liquor from the last tank, as with the lime solution already referred to.

During the treatment of the juice with lime in the last two tanks, the organic acids combine with the lime and form soluble lime salts. These salts will go through the entire process and be found in the molasses, to which is imparted a bitter taste. By adding a dilute solution of phosphoric acid to the juice as it overflows the rim of the last tank, the lime combines and forms phosphate of lime, leaving the organic acids in solution, which are less harmful than their lime salts. Many of these acids disappear during the evaporation, being volatile, and are carried off with the vapors in the effects.

By having the tops of the tanks decreasing in height, about six inches, a gentle, but continuous, flow of liquor is secured by gravity throughout the entire system.

As the liquor flows through the system, it is progressively heated by the heating coils within the tanks, the temperature being raised progressively from the normal, after leaving the sulphur box, to 140° F., or 150° F., when delivered to the defecator charge tank.

This progressive heating of the juice facilitates the efficiency of the liming treatment and, at the same time, reduces the amount of heat required in the defecators.

A sieve is placed in each lime box to catch any grit or unslacked lime as it comes from the lime supply pipe.

It will be seen that the operator has complete control at all times of the liming process. He tests the juice at frequent intervals and increases or decreases the amount of lime as these tests indicate the necessity. For example, if phenol phthalein is used as an indicator, and 10 cc. of the juice titrated against a $\frac{1}{10}$ N. alkali solution, the acidity of the sulphured juice is 4% and the neutral point .5%, then the acidity of the juice in tank #2 should be 1.9%, tank #3 .85% and tank #4 .5%. If there are any variations in these gradually decreasing acidities, the operator can increase or decrease the flow of lime into each tank until the normal conditions are secured. In fact, the chief virtue of the apparatus is the control obtained of the liming and heating during the period it requires the juice to flow from the sulphur station to the defecator charge tank.

The residue from the various mud wells may be filtered and carried back to the system as desired.

Thus, it will be seen that I provide a method and apparatus in which the saccharine liquor flows continuously throughout the system, is progressively and thoroughly limed and heated and the major portion of the solid impurities are removed therefrom by processes of sedimentation.

While I have illustrated a preferred form of apparatus for carrying out the hereinbefore described process, I do not mean to limit the invention to details either of the process or of the apparatus, except as particularly pointed out in the claims.

Having thus described my invention, what I claim and desire to secure by Letters Patent of the United States is:—

1. The process of treating saccharine solutions which consists in imparting a swirling motion to a vertically ascending cylindrical column of the liquid, causing it to form a thin annular film, and in continuously spraying into this film while in motion a chemical reagent in solution.

2. The process of treating saccharine solutions which consists in imparting a swirling motion to a vertically ascending cylindrical column of the liquid, causing it to form a thin annular film, and in continuously spraying into this film while in motion milk of lime.

3. The continuous process of progressively treating saccharine solutions, which consists in causing the liquid to flow upward in vertical columns in a series of cylindrical containers, imparting a swirling motion to the liquid near the top of each container causing it to overflow in a thin annular film, continuously causing the liquid to flow progressively by gravity from one container to the next, and spraying into the inner face of this film at the overflowing top of each container a chemical reagent in solution.

4. The continuous process of progressively treating saccharine solutions, which consists in causing the liquid to flow upward in vertical columns in a series of cylindrical containers, imparting a swirling motion to the liquid near the top of each container causing it to overflow in a thin annular film, continuously causing the liquid to flow progressively by gravity from one container to the next, and spraying into the inner face of this film at the overflowing top of each container milk of lime.

5. The continuous process of progressively treating saccharine solutions, which consists in causing the liquid to flow upward in vertical columns in a series of cylindrical containers, imparting a swirling motion to the liquid near the top of each container causing it to overflow in a thin annular film, continuously causing the liquid to flow progressively by gravity from one container to the next, and spraying into the inner face of this film at the overflowing top of each container milk of lime in progressively decreasing quantities to each tank.

6. The continuous process of progressively treating saccharine solutions, which consists in causing the liquid to flow upward in vertical columns in a series of cylindrical containers, imparting a swirling motion to the liquid near the top of each container causing it to overflow in a thin annular film, continuously causing the liquid to flow progressively by gravity from one container to the next, spraying into the inner face of the film at the overflowing top of each container a chemical reagent, and progressively heating the liquid as it rises in each container.

7. The continuous process of progressively treating saccharine solutions, which consists in causing the liquid to flow upward in vertical columns in a series of cylindrical containers, imparting a swirling motion to the liquid near the top of each container causing it to overflow in a thin annular film, continuously causing the liquid to flow progressively by gravity from one container to the next spraying into the inner face of the film at the overflowing top of each container a chemical reagent, drawing off from time to time the sediment from each container and progressively heating the liquid as it rises in each container.

8. The continuous process of progressively treating saccharine solutions which consists in causing the liquid to flow upward in vertical columns in a series of cylindrical containers imparting a swirling motion to the liquid near the top of each container causing it to overflow in a thin annular film, continuously causing the liquid to flow progressively by gravity from one container to the next, spraying into the inner face of the film at the overflowing top of each container milk of lime in decreasing proportions, and progressively heating the liquid as it rises in each container.

9. The continuous process of progressively treating saccharine solutions, which consists in causing the liquid to flow upward in vertical columns in a series of cylindrical containers, imparting a swirling motion to the liquid near the top of each container causing it to overflow in a thin annular film, continuously causing the liquid to flow progressively by gravity from one container to the next, spraying into the inner face of the film at the overflowing top of each container milk of lime in decreasing proportions, drawing off from time to time the sediment from each container, and progressively heating the liquid as it rises in each container.

IRVING H. MORSE.